United States Patent [19]

Matsushita

[11] 4,196,911
[45] Apr. 8, 1980

[54] MECHANICAL SEAL

[75] Inventor: Mitsuyoshi Matsushita, Tokyo, Japan

[73] Assignee: Tanken Seiko Corp., Tokyo, Japan

[21] Appl. No.: 955,269

[22] Filed: Oct. 26, 1978

[30] Foreign Application Priority Data

May 15, 1978 [JP] Japan .................. 53-63845

[51] Int. Cl.² .................................. F16J 15/34
[52] U.S. Cl. .................... 277/74; 277/75; 277/96.1; 277/86
[58] Field of Search ............... 277/75, 76, 74, 38, 277/40, 41, 86, 93 R, 93 SD, 96, 96.1, 92, 22

[56] References Cited

U.S. PATENT DOCUMENTS

| | | | |
|---|---|---|---|
| 2,895,751 | 7/1959 | Standish | 277/75 X |
| 3,389,434 | 6/1968 | Cleereman et al. | 277/96.1 X |
| 3,589,738 | 6/1971 | Tracy | 277/74 |
| 3,628,799 | 12/1977 | Wiese | 277/75 X |
| 3,759,532 | 9/1973 | Lindeboom | 277/75 X |
| 3,837,659 | 9/1974 | Moncrilf | 277/74 |
| 3,970,320 | 7/1976 | Wiese | 277/74 |

FOREIGN PATENT DOCUMENTS

| | | | |
|---|---|---|---|
| 2222043 | 11/1973 | Fed. Rep. of Germany | 277/96.1 |
| 1227468 | 3/1960 | France | 277/86 |
| 100311 | 1/1962 | Netherlands | 277/74 |
| 811299 | 4/1959 | United Kingdom | 277/74 |
| 920892 | 3/1963 | United Kingdom | 277/96.1 |

Primary Examiner—Robert S. Ward, Jr.
Attorney, Agent, or Firm—George B. Oujevolk

[57] ABSTRACT

A mechanical seal has a seal ring whose sealing face is divided into an inner part and an outer part by a circular groove through which sealing liquid is fed. The inner part of the sealing face is concave in the axial direction thereof.

5 Claims, 7 Drawing Figures

FIG_1 PRIOR ART
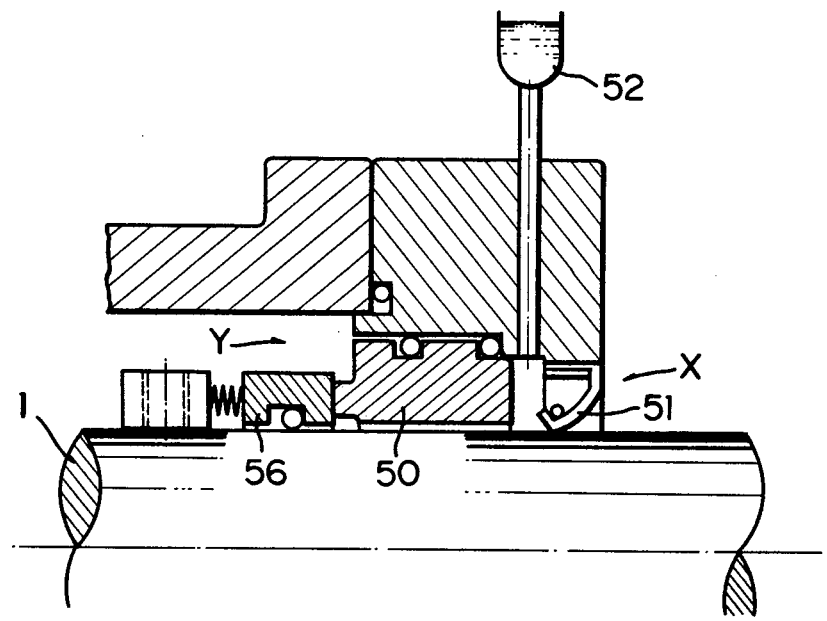
PRIOR ART FIG_2
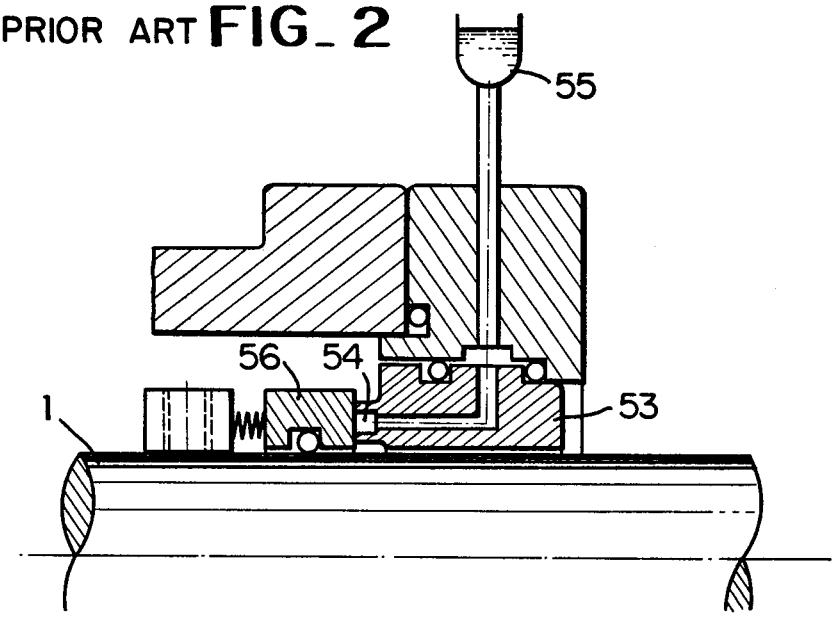

FIG_3 PRIOR ART
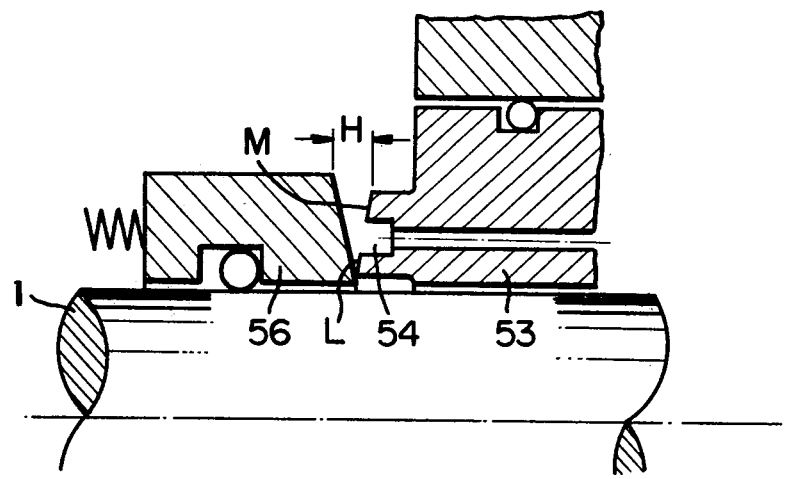
PRIOR ART FIG_4
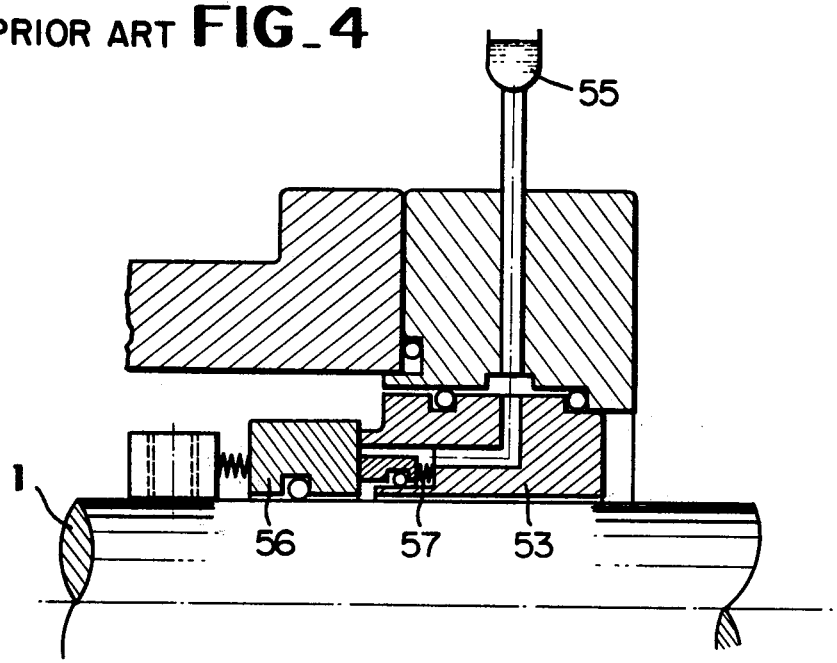

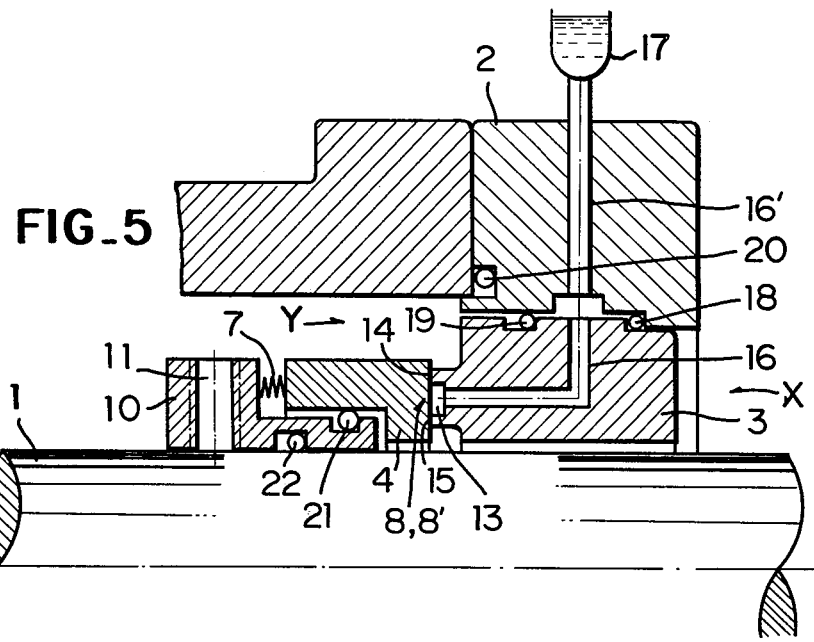
FIG_5
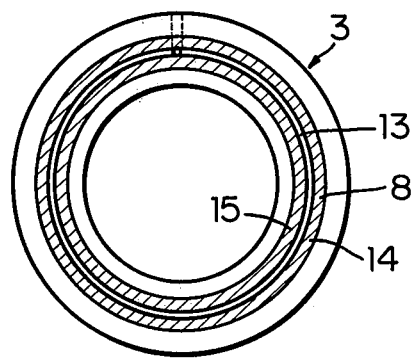
FIG_6
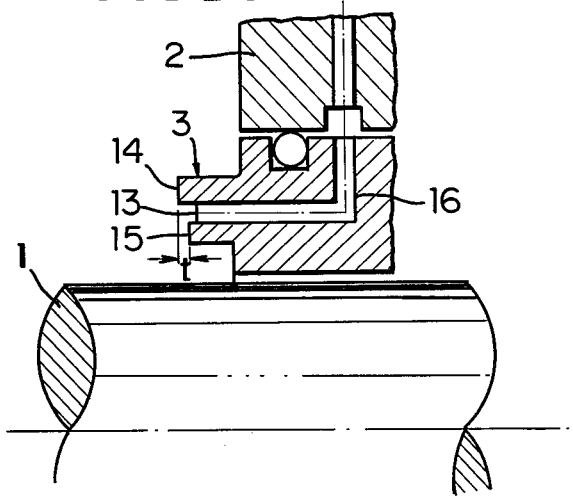
FIG_7

MECHANICAL SEAL

BACKGROUND OF THE INVENTION

The present invention relates to a mechanical seal, and more particularly to a mechanical seal which could be applied to a refrigerator, a vacuum pump and the like, the inside of which alternatively changes from a vacuum condition to a pressure condition and vice versa. With the foregoing mechanical seal, there are problems such as, when the inside of equipment using the mechanical seal is in vacuum condition, the atmosphere flows into the inside through the sealing faces fo the seal rings, and the sealing faces become dry and burnt.

BRIEF DESCRIPTION OF THE PRIOR ART

To solve the problem, conventional techniques have been proposed as illustrated with reference to FIGS. 1 to 4 of the accompanying drawing.

FIG. 1 illustrates a mechanical seal which has an oil seal 51 on the atmosphere side (x) of the seat ring 50. In the space between the seal ring 50 and the oil seal 51, the oil is provided by an oil container 52. Thus, this type of mechanical seal prevents the atmosphere from flowing into the inside through the sealing faces. The oil seal, however, is rather weak and easily damaged. A shaft 1 of the equipment is sometimes damaged by the oil seal 51 and oil seapage.

FIG. 2 shows a mechanical seal wherein the sealing face of the seal's seat ring 53 has a circular oil groove 54 which divides the sealing face at its center into an inner and outer part. Oil container 55 flows oil into the oil groove 54 and forms a liquid film on the sealing face sufficient to avoid the atmosphere from flowing into the inside through the sealing faces when the inside is a vacuum. On the contrary, when the inside is under pressure in which sealed liquid, for example refrigerator oil fills up, the inner part (L) of the sealing face becomes thick and forms a convex shape which is not cooled by the sealed liquid, and the outer part (M) of the sealing face does not also become thick, and is cooled by the sealed liquid as shown in FIG. 3. The convex shape is caused by the difference in the rate of expansion in the axial direction of the sealing faces by the heat of friction between the inner part (L) and the outer part (M).

The inner part of the sealing face of rotary ring 56 also becomes convex in the axial directin. Thus, a gap is formed between the seat ring 53 and the rotary seal ring 56. The liquid under pressure in the inside of the equipment flows into the oil container 55 through the gap and the oil groove 54, and sometimes overflows out of the oil container 55. Since the sealing faces of the seal ring 53 and the rotary seal ring 56 are made of hard materials, it takes a considerable time for the convex part of the rotary ring 56 and the inner part (L) to wear each other out and act as sealing faces. While wearing out, this type of mechanical seal does not function as an axial seal.

In the mechanical seal shown in FIG. 4, an inner part of a seat ring 53 is cut off and held by a spring 57. The inner part is movable with respect to the seat ring 53 in the axial direction, and follows the discrepance of the expansion in the axial direction by the heat of friction between the inner and outer parts of both the seat ring 53 and the rotary seal ring 56. However, this type of mechanical seals are expensive, of large size and complicated in structure.

OBJECTS FO THE INVENTION

It is an object of the present invention to provide a mechanical seal which furnishes a good seal for a rotary member irrespective of the conditions of the inside of the equipment.

It is another object of the invention to provide a mechanical seal, in which there is no gap between the seal rings and the sealed liquid does not flow out of the equipment when the inside is under pressure.

It is a further object of the invention to provide a mechanical seal through which the atmospheric air does not flow into the inside of the equipment and the sealing face of which does not become dry and burnt.

It is still a further object of the invention to provide a mechanical seal which is inexpensive, simple in structure and easy to manufacture.

SUMMARY OF THE INVENTION

Generally speaking, the present invention contemplates a mechanical seal which includes sealing rings whose seal faces are divided into outer and inner parts. The inner part is concave in the axial direction thereof with a circular groove into which sealing liquid is fed through a communicating aperture, and, feed means which feeds sealing liquid into the circular groove through said communicating aperture.

Other objects and advantages of the invention will be more readily apparent from the following detailed description, when taken together with the accompanying drawings, in which:

BRIEF DESCRIPTION OF THE DRAWINGS

FIGS. 1 to 4 are explanatory views of the prior art;
FIG. 5 is a half cross sectional view of the mechanical seal according to the inventive concept;
FIG. 6 is a detailed view of the sealing face of the seat ring in the mechanical seal shown in FIG. 5; and,
FIG. 7 is an enlarged diagrammatical view of the mechanical seal shown in FIG. 5.

DETAILED DESCRIPTION OF THE INVENTION

In FIG. 5 is shown a rotary shaft 1 for equipment having a casing 2. Reference mark (Y) indicates the interior of the mechanical seal and (X) indicates the exterior of the mechanical seal, i.e., the atmospheric air. There is a seat ring 3 and a seal ring 4 movable in the axial direction. Rotary seal ring 4 is pressed against seat ring 3 by a spring 7 sufficiently to form sealing faces 8, 8'. A collar 10 is fixed to the rotary shaft 1 with a set-screw 11. The rotary seal ring 4 is connected to the collar 10 by a rotation-stopping pin (not shown) and capable of rotation together with the rotary shaft 1 and the collar 10. The sealing face 8 of the seat ring 3 has a circular groove 13 which divides the sealing face 8 into an inner part 15 and an outer part 14 at the center. The inner part 15 of the sealing face 8 is concave in the axial direction with respect to the outer part 14. This forms a gap (t). The thickness of the gap (t), which is determined by the material of the seat ring and conditions of expansion by heat of friction, is in general about 10 micro meters, preferably several micro meters. In the illustration shown in the drawing, the thickness of the gap (t) is from three to five micro meters. The concave inner part 15 of the sealing face 8 can be readily formed by a mechanical or hand lapping process by using an appropriate jig after having lapped over the sealing face 8 to an evenly flat face. This concave inner part 15 may be formed in a taper towards the center of seat ring 3. Seat ring 3 has an aperture 16 communicating to groove 13. With the atmospheric air, seat ring 3 communicates by means of another aperture 16' formed in casing 2. This mechanical seal has a sealing liquid container 17 which feeds a sealing liquid to the groove 13 through the communicating apertures 16, 16'. In FIG. 5, reference numerals 18 and 22 are o-rings.

OPERATION OF THE INVENTION

When the shaft 1 rotates, the rotary seal 4 follows the rotation and the sealing face 8 slides and rotates with respect to sealing face 8'. The sealing face 8 expands in the axial direction by heat of friction. The expansion of outer part 14 of the sealing face 8 is rather smaller than that of the inner part 15 because the former is cooled by the sealed liquid in the equipment. Thus the gap (t) is eliminated promptly after the rotation starts, and the outer part 14 and the inner part 15 slidably contact the sealing face 8' of the rotary seal 4. Consequently, the sealed liquid in the equipment does not flow out into the sealing liquid container 17 through the groove 13 and the communicating apertures 16, 16'. Since the sealing liquid continuously supplied by container 17 through the grove 13 and the communicating holes 16, 16', the liquid film always covers the sealing faces 8, 8', the atmosphere does not flow into the inside of the equipment using the mechanical seal of the invention, and the sealing faces 8, 8' do not become dry and burnt even when the inside of the equipment is in a vacuum state.

Although the invention has been described in its preferred form, it is understood that many apparently different embodiments of this invention may be made without departing from the spirit and scope thereof. For example, the groove 13, the outer part 14 and the concave inner part 15 may be formed on the sealing face 8' of the rotary seal ring 4 and also they may be formed on both of the sealing faces 8 and 8'.

What is claimed is:

1. A mechanical seal which is applied to a piece of equipment, the inside of which alternatively changes from a vacuum condition to a pressure condition, comprising:
   (a) a seal ring having a sealing face divided into an outer part, and an inner part defining a concave portion in the axial direction thereof, the sealing face having a circular groove through which sealing liquid is fed and said concave portion expanding in the axial direction during operation;
   (b) a communicating port through which said sealing liquid is fed into said circular groove; and,
   (c) feed means which feeds sealing liquid into the circular groove through said communicating port.

2. A mechanical seal as claimed in claim 1, wherein the inner part of the seal ring which has a concave portion in the axial direction thereof is tapered toward the center of said seal ring and said concave portion expands in the axial direction during operation.

3. A mechanical seal which is applied to a piece of equipment, the inside of which alternatively changes from a vacuum condition to a pressure condition, comprising:
   (a) a seat ring (3) whose sealing face is divided into an outer part (14) and an inner part (15) which defines a concave portion in the axial direction to form a gap which is to be eliminated during rotation thereof, the sealing face having a circular groove (13) which receives sealing liquid;
   (b) a rotary seal ring (4) whose sealing face is even and flat;
   (c) a communicating port (16) through which sealing liquid is fed into said circular groove (13); and,
   (d) means (17) which feeds sealing liquid into a circular groove (13) through the communicating port (16).

4. A mechanical seal which is applied to a piece of equipment, the inside of which alternatively changes from a vacuum condition to a pressure condition, comprising: a rotary seal ring (4) having a sealing face divided into an outer part (14) and an inner part (15) which defines a concave portion in the axial direction thereof to form a gap which is to be eliminated during the rotation thereof, with a circular groove (13), a seat ring (3) whose sealing face is even and flat, a communicating port (16) through which sealing liquid is fed into said circular groove (13), and feed means to feed sealing liquid into the circular groove (13) through said communicating port (16).

5. A mechanical seal which is applied to a piece of equipment, the inside of which alternatively changes from a vacuum condition to a pressure condition, comprising: a seat ring (3) and a rotary seal ring (4) with sealing faces divided into outer parts (4) and inner parts (15) which are concave in the axial direction thereof to form gaps which are to be eliminated during operation, a circular groove (13), and feed means which feed sealing liquid into the circular groove (13) through said communicating port (16).

* * * * *